United States Patent
Seiler et al.

(10) Patent No.: US 10,977,202 B2
(45) Date of Patent: Apr. 13, 2021

(54) ADAPTABLE CONNECTOR WITH EXTERNAL I/O PORT

(71) Applicant: HEWLETT-PACKARD DEVELOPMENT COMPANY, L.P., Spring, TX (US)

(72) Inventors: Peter Seiler, Fort Collins, CO (US); Justin Barth, Fort Collins, CO (US); Mark Lessman, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,791

(22) PCT Filed: Jan. 28, 2017

(86) PCT No.: PCT/US2017/015523
§ 371 (c)(1),
(2) Date: Jul. 29, 2019

(87) PCT Pub. No.: WO2018/140045
PCT Pub. Date: Aug. 2, 2018

(65) Prior Publication Data
US 2019/0391944 A1    Dec. 26, 2019

(51) Int. Cl.
*G06F 13/38*    (2006.01)
*G06F 1/18*    (2006.01)
*G06F 13/40*    (2006.01)
*G06F 13/42*    (2006.01)
*G06K 19/077*    (2006.01)

(52) U.S. Cl.
CPC ............ *G06F 13/385* (2013.01); *G06F 1/183* (2013.01); *G06F 13/4022* (2013.01); *G06F 13/4068* (2013.01); *G06F 13/4282* (2013.01); *G06K 19/07732* (2013.01); *G06K 19/07733* (2013.01); *G06F 2213/0024* (2013.01)

(58) Field of Classification Search
CPC .. G06F 13/385; G06F 13/183; G06F 13/4022; G06F 13/4068; G06F 13/4282; G06F 2213/0024
See application file for complete search history.

(56) References Cited

U.S. PATENT DOCUMENTS

| 8,952,566 B2 | 2/2015 | Harris et al. |
| 10,296,484 B2* | 5/2019 | Garibay .............. G06F 13/4282 |
| 2003/0231649 A1 | 12/2003 | Awoseyi et al. |
| 2005/0251609 A1 | 11/2005 | Chou |

(Continued)

FOREIGN PATENT DOCUMENTS

| CN | 104820474 A | 8/2015 |
| CN | 105549694 A | 5/2016 |

(Continued)

*Primary Examiner* — Henry Tsai
*Assistant Examiner* — Aurangzeb Hassan
(74) *Attorney, Agent, or Firm* — Michael A. Dryja (57) ABSTRACT

An adaptable connector, a non-standard PCIe module, and a computer readable medium are disclosed. The adaptable connector for a PCIe interface allows for multiple standard PCIe modules and non-standard PCIe modules at different times An external I/O port has a set of non-PCIe I/O signal lanes coupled to the adaptable connector in lieu of a set of root port host PCIe signal lanes when a non-standard PCIe module is mated to the adaptable connector.

15 Claims, 4 Drawing Sheets

(56) References Cited

U.S. PATENT DOCUMENTS

| | | | |
|---|---|---|---|
| 2006/0143338 A1* | 6/2006 | Hunsaker | G06F 13/4295 |
| | | | 710/60 |
| 2009/0049213 A1* | 2/2009 | Chen | G06F 13/385 |
| | | | 710/104 |
| 2010/0049878 A1 | 2/2010 | Yu et al. | |
| 2012/0265918 A1 | 10/2012 | Nakajima et al. | |
| 2013/0038999 A1 | 2/2013 | Tian et al. | |
| 2013/0083338 A1 | 4/2013 | Fahrenkrug et al. | |
| 2013/0151840 A1* | 6/2013 | Kanigicherla | G06F 9/461 |
| | | | 713/100 |
| 2013/0294023 A1 | 11/2013 | Gay | |
| 2013/0346756 A1* | 12/2013 | Cook | G06F 21/00 |
| | | | 713/189 |
| 2013/0346987 A1* | 12/2013 | Raney | G06F 9/5044 |
| | | | 718/102 |
| 2014/0013024 A1 | 1/2014 | Lamm et al. | |
| 2014/0101932 A1 | 4/2014 | Schnell et al. | |
| 2015/0074320 A1 | 3/2015 | Galles et al. | |
| 2016/0170914 A1 | 6/2016 | Pethe | |
| 2017/0011002 A1 | 1/2017 | Shin | |
| 2017/0371823 A1* | 12/2017 | Pearson | G06F 13/4282 |
| 2018/0181432 A1* | 6/2018 | Adler | G06F 15/76 |
| 2018/0267850 A1* | 9/2018 | Froelich | G06F 11/221 |
| 2019/0310951 A1* | 10/2019 | Mugunda | G06F 3/0601 |

FOREIGN PATENT DOCUMENTS

| | | |
|---|---|---|
| WO | WO-2015126383 A1 | 8/2015 |
| WO | WO-2016018296 A1 | 2/2016 |

\* cited by examiner

ADAPTABLE CONNECTOR WITH EXTERNAL I/O PORT

BACKGROUND

As computer devices shrink in size the amount of case area for I/O ports also decreases. This decrease is similar for handhelds, notebooks, desktops, servers. However, to have models of a computer device appeal to diverse users with different desires, a model of a computer device should have multiple configurations available.

BRIEF DESCRIPTION OF THE DRAWINGS

The disclosure is better understood in relation to the following drawings. The elements of the drawings are not necessarily to scale relative to each other. Rather, emphasis has instead been placed upon clearly illustrating the claimed subject matter. Furthermore, like reference numerals designate corresponding similar, though perhaps not identical, components through the several views. For the sake of brevity, reference numerals or features having a previously described function may or may not be described in connection with other drawings in which they appear.

DETAILED DESCRIPTION

With modern computers form factors shrinking, connectivity feature support and options have accordingly been decreasing. This decreased feature support is inconsistent with the much broader connectivity, display, and storage options available nowadays due to an increasing number of industry standards for input/output (I/O) ports. Furthermore, these industry standards are constantly changing. An I/O interface designed into a computer device may become outdated or obsolete and a user may desire to upgrade. Unfortunately, it has been difficult to develop ever smaller form factor computers, due to limited case area, with the connectivity options and flexibility of larger past models without using bulky and unsightly external dongles or port replicators. These dongles and port replicators are not usable in many situations and may diminish an elegant industrial design used to compete in the marketplace.

For instance, a computer manufacturer may implement a built-in LAN-on-motherboard (LOM) that may be limited to a speed of 1 Gb/s (gigabits/sec) Ethernet port for cost reasons. On larger desktop and server systems, if a user wishes to have a faster Ethernet connection, the user may install a peripheral component interface (PCI, a parallel bus standard) or PCI express (PCIe, a differential serial bus standard) expansion card that includes a faster media access controller (MAC) and physical layer interface (PHY). Alternatively, if cost and motherboard space is not constrained then a faster MAC and PHY controller combination may be used on the motherboard as an alternative LOM (ALOM). However, with smaller form factor (SFF) computers, there typically are not PCI or PCIe expansion card slots available due to space constraints and cost is usually a top consideration.

The disclosed example implementations solve many issues with SFF and other small to large computer devices (or in a more general term, 'computers'). These example implementations may also provide a more cost efficient approach. Further, these disclosed example implementations open-up more I/O possibilities and configurations for an I/O port area on SFF computers and the concept can be extended to desktop, servers, notebooks, and other form factor computers and handheld devices. The implementations do so by having one or more external I/O ports that are coupled to an adaptable connector that allows for modified or non-standard PCIe M.2×4 connector signaling in these examples. However, the concepts described below can also be extended to other PCIe standards. Thus, the techniques and architectures disclose herein are applicable to many forms of PCIe standard defined interfaces but for brevity and clarity, the following discussion will be limited to operation with a PCIe M.2×4, ×2, or ×1 defined interface.

In some implementations, an external I/O port may form a single slot of interchangeable mechanical and electrical interface connectors to support various forms of I/O, thus increasing the available I/O feature support of SFF or other computer devices. For instance, an RJ-45 jack in the external I/O port may be exchanged with an external I/O port having an optical fiber network transceiver. In addition, the external I/O port may be a configurable physical I/O port including additional PCIe circuitry and thereby provide a technique of routing various I/O signals from an adaptable PCIe M.2 connector in lieu of one or more sets of PCIe signal lanes from a PCIe root port to the PCIe M.2 connector. That is, one or more of the PCIe signal lanes of a PCIe M.2×4, ×2, or ×1 interface may instead be used to provide an electrical interface to the configurable physical I/O port. More detail on example implementations follow in the description of the drawings.

Figure 1A:
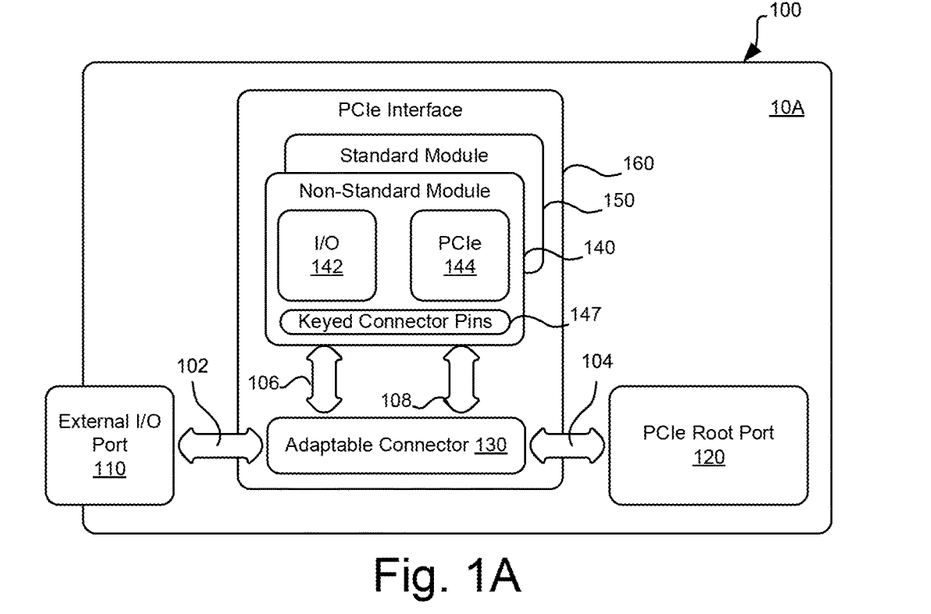
FIG. 1A is a block diagram of an example computer device with a PCIe interface having an example adaptable connector coupled to an external I/O port.

FIG. 1A is a block diagram 100 of a first computer device 10A with a PCIe interface 160 having an example adaptable connector 130 coupled to an external I/O port 110. The adaptable connector 130 is coupled to a PCIe root port 120 via a set of first root port PCIe signal lanes 104. The PCIe root port 120 may be located on the computer device's processor or it may be located on a host interface chip such as a "Northbridge", a "Southbridge" integrated circuit, PCIe switch, or other discrete device interconnected to the processor local bus, also known as a front side bus, or other high speed bus. Generally, Northbridge is a front side bus memory and high speed I/O controller and Southbridge is a general-purpose I/O controller. The adaptable connector 130 may interface or mate with both PCIe M.2 standard modules 150 and PCIe M.2 non-standard modules 140 that have been modified to operate with the adaptable connector 130 and external I/O port 110.

The external I/O port 110 may be a "fixed" built-in port of a computing device or it may be a removable and replaceable component. It may have a mechanical interface to fit within one or more of the I/O areas of the computing device 10B. It may also have an electrical interface for coupling connector pins or other components for signal modification, protection, translation, and the like when coupled to the port signal lanes 102.

PCIe is a standard local I/O bus with a set of PCIe signal lanes for a wide variety of computers including desktops, servers, communication, workstation, and embedded devices. A PCIe signal lane includes a transmit low voltage differential pair and a receive low voltage differential pair or four signal wires per signal lane. PCIe M.2 is a computer bus interface specification provided through an M.2 connector, formally known as the next generation form factor (NGFF). PCIe M.2 may use up to four (×4) lanes of transmit/receive signal pairs of PCIe 3.0 signaling, with backwards compatibility down to PCIe 1.0, and a data rate of up to 8GT/s (transactions/sec) with PCIe 3.0. The total bandwidth for a PCIe×4 interface is 3.9 GB/s (gigabytes/sec) and a data transfer rate of 32 GT/s. Depending on different key notches, the PCI M.2 interface can provide up to four lanes (noted as ×4 with eight differential signal pairs or 16 signal wires) of PCIe 3.0 signaling, serial ATA 3.0 signaling, or USB 3.0 (USB 2.0 compatible) signaling. The different key notches prevent inadvertent plugging of the different types of signaling modules into feature incompatible host connectors.

An M.2 module has a 75-position edge connector, although certain pin positions may be removed. The key-ID variant "M" has notched pins at locations 59-66 and provides for PCIe×4 signal lanes, a SATA (serial ATA) interface, and an SMBus (system management bus) interface. The key-ID variant "B" has notched pins at locations 12-19 and provides for PCIe×2 signal lanes (four differential signal pairs or eight signal wires), a SATA interface, USB 3.0, audio, UIM (user identify module), HSIC (USB high speed inter-chip), SSIC (USB super speed inter-chip), I²C (inter-integrated circuit). and SMBus interfaces.

Rather than having to have multiple slots, in the example implementations discussed below, a "M", "B", or combined "M and B" connector can be used as an adaptable connector 130 and the M.2 defined PCIe signal lanes are adapted to provide non-PCIe signals to provide I/O signaling to external I/O port interfaces from specially modified non-standard modules that accept PCIe signals and create I/O signals. The adaptable connector 130 is still able to support any non-modified standard PCIe M.2 modules that conform to the PCIe M.2 specification for the corresponding keyed connector. Also, in some examples, the M.2 defined PCIe signal lanes designated for the adaptable connector 130 may instead be routed to external I/O port interfaces to allow for additional I/O flexibility.

For example, a non-standard PCIe module 140 includes a set of keyed connector pins 147 having a set of standard defined PCIe endpoint connector pins for mating to a respective standard keyed PCIe M.2 connector. The non-standard PCIe module 140 also has a PCIe interface 144 having PCIe standard signal lanes coupled to a portion of the set of standard defined PCIe endpoint connector pins that can be inserted into and mate with the adaptable connector 130. An I/O interface 142 is coupled to the PCIe interface 144 and the I/O interface 142 has a set of non-PCIe signals (differential or signal-ended) coupled to a different portion of the set of standard defined PCIe endpoint connector pins such that when the non-standard module 140 is inserted into and mated with the adaptable connector 130 the non-PCI signals are coupled via I/O connector signal lanes 102 to the external I/O port 110.

In FIG. 1A, the adaptable connector 130 is further coupled to the external I/O port 110 via a set of non-PCIe I/O port signal lanes 102 from a partial set of PCIe signal lane defined pins in the adaptable connector 130. In other words, the first computer device 10A may include an adaptable connector 130 for a M.2-type PCIe interface 160 (of different keyed types, though "M", "B", and "M and B" being the most common) to allow for multiple types of PCIe modules to occupy adaptable connector 130 at different times. A non-standard module 140 is modified for use from the M.2 specification to operate with the adaptable connector 130 and has a PCIe interface 144. A standard module 150 is not modified from and is compliant with the M.2 specification for the particular keyed M.2 slot standard. That is, one of the non-standard module 140 and the standard module 150 is to occupy the adaptable connector 130 slot at any particular time. There may be additional non-standard modules 140 that are adapted in various ways as well as additional standard modules 150 that conform to the M.2 specification that are usable and operational with the adaptable connector 130.

Each of the non-standard module 140 and the standard module 150 have a set of PCIe signal lanes 108 coupled to module connector pins that when inserted in adaptable connector 130 couples to M.2 specification ×1 or ×2 defined first root port PCIe signal lanes 104 to the PCIe root port 120. Also, the non-standard module 140 as modified from the PCIe M.2 specification has a set of non-PCIe signal lanes (differential or single-ended) coupled to module connector pins that occupy some or all the remaining PCIe differential signal lines. When inserted in and mated with the adaptable connector 130 the non-PCIe signal lanes from I/O interface 142 couples to non-PCIe I/O port signal lanes 102 to the external I/O port 110. Contrarily, the PCIe M.2 specification defines these connector pins coupled to the non-standard module non-PCIe I/O port signal lanes 102 in adaptable connector 130 to be PCIe signal lanes. Thus, the external I/O port 110 has a set of non-PCIe I/O port signal lanes 102 coupled to the adaptable connector 130 in lieu of a set of PCIe signal lanes as defined by the PCIe M.2 specification for the M.2 PCIe interface 160. Accordingly, a particular keyed PCIe M.2 connector in the interface may be adapted to be used for unintended purposes not defined in the PCIe M.2 specification. Yet, conformal PCIe M.2 modules may still be able to operate as per the PCIe M.2 specification.

For example, the standard module 150 may still have a limited set of PCIe×4 signal lanes (such as ×1 or ×2) available and thus its speed of operation may be limited due to reduced bandwidth but still operational. For instance, a PCIe M.2×4 storage device may still be inserted into the adaptable connector 130 but due to having one ×2 set (4 differential pairs) of PCIe signal lanes missing, its top speed is cut in half, yet it is still operational but at lower speeds. Note that all PCIe M.2×1 and ×2 modules for the appropriate keyed adaptable connector 130 retain their full operation ability in this example.

Non-standard modules 140 that are modified from the PCIe M.2 specification have their respective I/O interface 142 signals coupled to the non-PCIe signal lanes 106 when mated in the adaptable connector 130. The non-standard modules 140 likewise have their PCIe interface 144 endpoints coupled to the PCIe signal lanes 108 of the adaptable connector 130. Accordingly, non-standard modules 140 are modified to allow their respective I/O signaling for I/O interface 142 to be routed to the external I/O port 110 through the adaptable connector 130. Many different types of non-standard modules 140 may be modified to have their respective I/O signaling routed to the adaptable connector 130. Such types of non-standard modules 140 include but are not limited to differential or single-ended signals type I/O such as: Ethernet, DisplayPort, HDMI, VGA; DVI, SD UHS-II differential interface, USB 3.1 Gen2, Intel Thunderbolt, Firewire, Serial Port, and others such as RS-422 and RS-485.

In an example storage configuration, a PCIe storage-based non-standard module 140 may have a set of non-PCIe signal lanes, such as signals for an external SATA or USB 3.0 interface. These I/O signals 142, via port signal lanes 102, may be coupled to an external I/O port 110 that may include a respective eSATA or USB 3.0 connector for connection to external storage devices. Accordingly, several different configuration options are now available with the adaptable connector 130 and non-standard modules 140 than with a standard based PCIe M.2 connector and its specification compliant standard modules 150.

In an example Ethernet configuration, the non-standard PCIe module 140 may have the PCIe interface 144 as being a portion of an Ethernet media access control (MAC) controller. Also, the PCIe non-standard module 140 in this example may have the I/O interface as being a network physical layer interface (PHY) with management data Input/Output (MDIO) signaling.

Figure 1B:
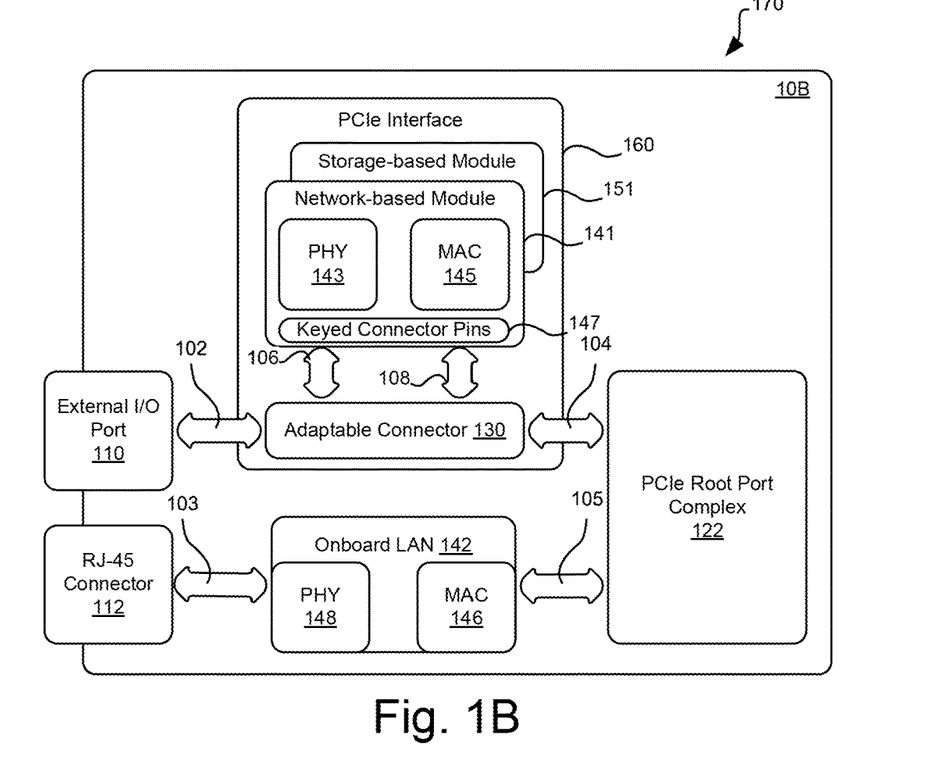
FIG. 1B is a block diagram of an example computer device with the example adaptable connector and external I/O port architecture of FIG. 1A along with an onboard LAN and an alternative onboard LAN.

For instance, FIG. 1B is a block diagram 170 of a second computer device 10B with a PCIe interface 160 having the example adaptable connector 130 and external I/O port 110 architecture of FIG. 1A with an onboard LAN 142 along with a non-standard (or custom) network-based module 141 as an alternative onboard LAN. The standard module 150 of FIG. 1A may in this example be a standard PCIe storage-based module 151 with ×1 or ×2 signal lanes couplable to adaptable connector 130 via PCIe signal lanes 108 and first root port PCIe signal lanes 104 to PCIe root port complex 122. A PCIe root port complex 122 may have multiple host PCIe root ports 120 to service multiple PCIe devices, such as PCIe interface 160 and onboard LAN 142. The network-based module 141 may be interchanged with a storage-based standard module 151. Thus, the second computer device 10B in this example has an option of having either two Ethernet interfaces as one configuration or a storage module and single Ethernet interface in another configuration.

The non-standard network-based module 141 has a MAC 145 using a PCIe×2 interface 104 coupled to adaptable connector 130 via PCIe signal lanes 108 when mated. The non-standard network-based module 141 also includes a PHY interface 143 creating a set of non-PCIe I/O signals, such as management data input/output (MDIO) bus signals, coupled to adaptable connector 130 via non-PCIe signal lanes 106 which is further coupled to external I/O port 110 through non-PCIe I/O port signal lanes 102. The second computer device 10B may also include an onboard LAN (local area network) 142 having its own MAC 146 and PHY 148 interfaces. The onboard LAN 142 is coupled to the PCIe root port complex 122 through another set of independent host PCIe signal lanes 105, either ×1, ×2, ×4, ×8, or ×16. The onboard LAN 142 is further coupled to an RJ-45 connector 112 or other Ethernet connector with MDIO bus signals to provide a first Ethernet port for the second computer device 10B. The external I/O port 110 may include another RJ-45 or other Ethernet connector, such as an optical fiber transceiver connector.

In another example configuration, a non-modified or standard PCIe M.2×4 storage-based module 151 may have an additional set of PCIe×2 signal lanes actually coupled to non-PCIe signal lanes 106 when mated and connected to adaptable connector 130 and the external I/O port would then be configured to remain unpopulated and the additional set of PCIe×2 signal lanes coupled to non-PCIe signal lanes 106 of storage-based module 151 would then be disconnected from the PCIe root port 120. However, the storage-based module 151 can still operate, albeit at a lower speed, with PCIe signal lanes 108.

Figure 2:
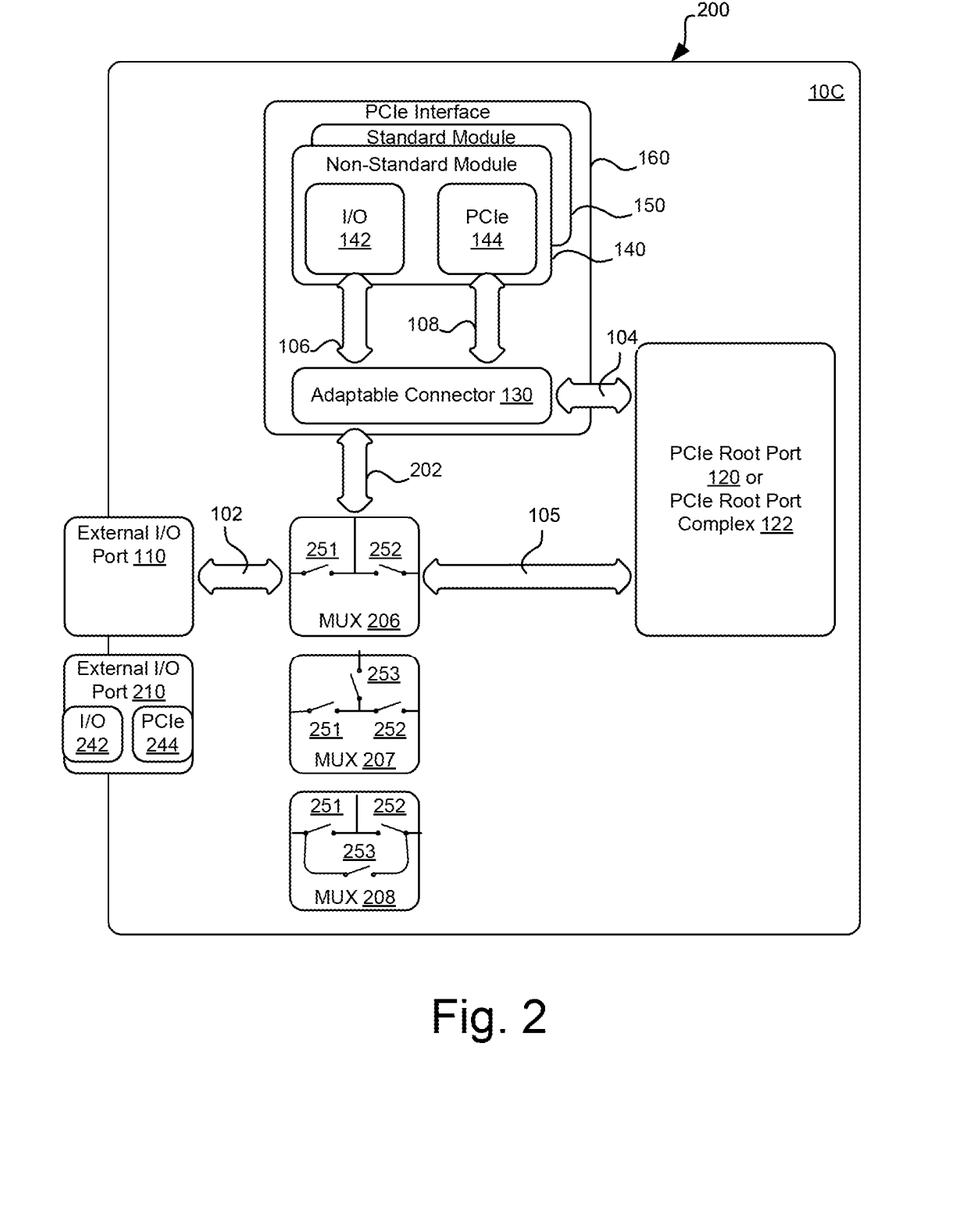
FIG. 2 is a block diagram of an example computer device with a PCIe interface having an example adaptable connector along with different external I/O ports and several types of multiplexors.

FIG. 2 is a block diagram 200 of a third computer device 10C with a PCIe interface 160 having an example adaptable connector 130 with an external I/O port 110 or alternative external I/O port 210 and including one of several types of multiplexors (MUX). To provide full functionality to the M.2×4 PCIe interface 160 for any standard modules 150, a first MUX 206 may be used to route a second set of PCIe signal lanes 105 from the PCIe root port 120 where the second set of PCIe signal lanes 105 come from the same root port as the first set of PCIe signal lanes 104. The root port PCIe signal lanes 104 and second set of PCIe signal lanes 105 are configured to part of the same PCIe controller in this example. When a non-standard module 140 is inserted into and detected in adaptable connector 130, the first MUX 206 is configured to route connector signal lanes 202 to the external I/O port 110 via I/O port signal lanes 102. However, when a standard module 150 is inserted into and detected in adaptable connector 130, the first MUX 206 is programmed to route the second set of PCIe signal lanes 105 to the adaptable connector 130 using the connector signal lanes 202. For instance, if the standard module 150 is a PCIe M.2×4 storage module and inserted into and mated with adaptable connector 130, all four PCIe signal lanes are used and the standard module 150 can operate at full bandwidth.

First MUX 206, in this example, shows a first switch 251 that represents a set of switches for each signal wire to be switched from the I/O port signal lanes 102 to the connector signal lanes 202. First MUX 206 also shows a second switch 252 that represents a set of switches for each signal wire to be switched from the second set of PCIe signal lanes 105 to the connector signal lanes 202.

First MUX 206 may be made up of one of several different multiplexors, cross-point switches, transfer gates, transistor switch circuits, or even a connector and PC board with appropriate routing for one-time configuration situations. For example, first MUX 206 may be a set of TI HD3SS3415 4 channel high performance differential switch integrated circuits designed to switch PCIe and other specification differential signals with up to 12 Gb/s. Another first MUX 206 possibility is a set of Maxim MAX4888C 8.0 Gb/s dual passive switches. In some examples first MUX 206 may be implemented using a set of SPDT switches such as Analog Devices HMC270A non-reflective DC-8 GHz switch or similar type products from several manufacturers. Several other switch and multiplexor integrated circuits exist in the marketplace and may be used to perform the first MUX 206 switching operation.

In another example configuration, first MUX 206 may be replaced with a second MUX 207 that has an additional third switch 253 coupling between the intersection of the first switch 251 and the second switch 252 and the connector signal lanes 202. Second switch 252 in MUX 207 connects the second set of PCIe signal lanes 105 to the I/O port signal lanes 102 via the first switch 251. The third switch 253 connects the connector signal lanes 202 to the I/O port signal lanes 102 via first switch 251. MUX 207 may be implemented with any of the aforementioned integrated circuits for first MUX 206.

Also, external I/O port 110 may be exchangeable with an alternate external I/O port 210. In this example, when a non-standard module 140 is inserted into adaptable connector 130 and detected, second MUX 207 may be configured using third switch 253 to switch the non-PCIe I/O port signal lanes 102 to the adaptable connector 130 via non-PCI connector signal lanes 202 from the external I/O port 110. However, when there is no non-standard module 140 inserted into adaptable connector 130 and external I/O port 110 is exchanged with the alternate external I/O module 210, then second MUX 207 may be configured using second switch 252 to route the second root port PCIe signal lanes 105 from a PCIe root port complex 122 to the alternate external I/O port 210 via I/O port signal lanes 102 now with PCIe signaling. The PCIe root port complex 122 may be configured to have the first root port signal lanes 104 and second root port signal lanes 105 be from separate independent host controllers for this example.

This arrangement allows for an alternate I/O port module 210 that may be plugged into the mechanical space of usual external I/O port 110. Alternate external I/O port 210 may have a PCIe interface 244 and an I/O interface 242. This configuration allows for very high speed I/O interfaces as the actual routing of interface I/O signals to the port connectors can be kept very short. Also, it allows for I/O signals of different voltages, frequencies, or types than one might be able to route through first MUX 206 or second MUX 207. For instance, optical network signals may not be routed on electrical-based I/O port signal lanes 102. An optical network interface supporting such optical connectors as SM905, ST, or various SC standards or others can be accommodated with alternate external I/O port 210 having an endpoint PCIe interface 244 for a MAC and the appropriate optical I/O interface 242 for the PHY.

Further, these MUX 207 and alternative external I/O port 210 type configurations allow the M.2 PCIe interface 160 to receive standard PCIe M.2×4 modules, such as storage devices, while still allowing for additional I/O in the external I/O port 110 mechanical area thereby increasing again I/O configuration flexibility. If the switches used to implement second MUX 207 are independently controllable and if no external I/O port 110 or alternate external I/O port 210 is detected, then the second set of PCIe signal lanes 105 may be routed to the adaptable connector 130 via the non-PCIe connector signal lanes 202 by having both second switch 252 and third switch 253 closed and first switch 251 open, thus allowing for full ×4 functionality of the M.2 PCIe interface 160. In this example the first root port lanes 104 and second set of PCIe lanes would come from the same root port in the PCIe root port complex 122.

Still another possibility is to replace first MUX 206 or second MUX 207 with a third MUX 208 similar to first MUX 207 but that has the additional third switch 253 placed to connect the second set of PCIe signal lanes 105 with the I/O port signal lanes 102, wherein the second set of PCIe signal lanes 105 are from a root port from the PCIe root port complex 122, which is separate from the root port sourcing the first root port PCIe signal lanes 104. When second switch 252 is closed and first switch 251 and third switch 253 are both open, this MUX 207 switch arrangement allows for having a single switch between the second set of PCIe signal lanes 105 and the I/O port signal lanes 102 that are coupling to the external I/O port 110 or alternate external I/O port 210. This use of a single switch may help in reducing reflections and/or maintaining signal integrity.

Figure 3:
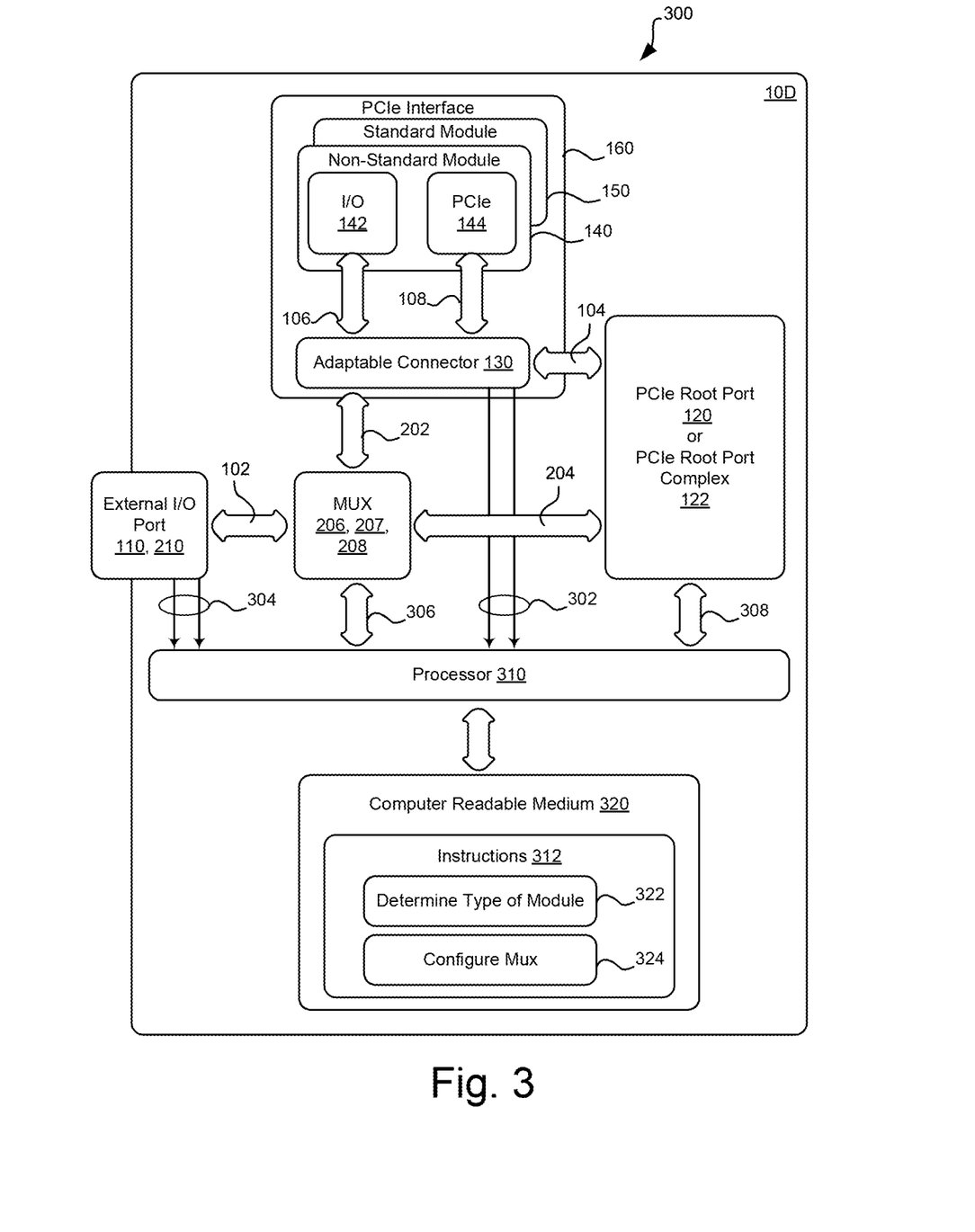
FIG. 3 is a block diagram of an example computer device with a PCIe interface having an example adaptable connector with an external I/O port along with a processor coupled to a non-transitory computer readable medium.

FIG. 3 is a block diagram 300 of a fourth computer device 10D with a PCIe interface 160 having an example adaptable connector 130 with an external I/O port 110 or alternative external I/O port 210 and a processor 310. The multiplexor may be any one of first MUX 206, second MUX 207, or third MUX 208 and controllable by a processor 310 using mux control signals 306. The processor 310 may be coupled to multiple forms of memory including tangible and non-transitory computer readable medium (CRM) 320. The processor 310 is also coupled to PCIe root port 120 via a processor local bus 308 with instructions 312.

Computer readable medium 320 allows for storage of one or more sets of data structures and instructions 312 (e.g. software, firmware, logic) embodying or utilized by any one or more of the methodologies or functions described herein. The instructions 312 may also reside, completely or at least partially, with the static memory, the main memory, and/or within the processor 310 during execution by the computer device 10D. The main memory and the processor memory also constitute computer readable medium 320. The term "computer readable medium" 320 may include single medium or multiple media (centralized or distributed) that store the one or more instructions 312 or data structures. The computer readable medium 320 may be implemented to include, but not limited to, solid state, optical, and magnetic media whether volatile or non-volatile. Such examples include, semiconductor memory devices (e.g. Erasable Programmable Read-Only Memory (EPROM), Electrically Erasable Programmable Read-Only Memory (EEPROM), and flash memory devices), magnetic discs such as internal hard drives and removable disks, magneto-optical disks, and CD-ROM (Compact Disc Read-Only Memory) and DVD (Digital Versatile Disc) disks.

In this example, CRM 320 includes instructions 312 that when read and executed by the processor 310 allow for configuration of the routing of signals through a respective multiplexor 206, 207, 208. In block 322, the instructions 312 allow for determining the type of module is inserted in M.2 PCIe interface 160. The types of modules may be non-standard modules 140 as previously discussed or they may be PCIe M.2 specification compliant standard modules 150. To help determine the type of module, there may be a set of one or more hard strapped configuration signals such as interface configuration pins 302 and/or port configuration pins 304. In some examples, a single signal may be used instead of multiple signal wires for either or both port configuration pins 304 or interface configuration pins 302. The level of voltage on the signal may be used to encode which type of module. Accordingly, a multi-level strap may be implemented where a single pin is used to indicate one of several configuration options. Further, the determination of the type of module may include information read from BIOS settings or performed by a BIOS routine in the CRM 320. Determination may also be performed by reading any inserted module over the first root port PCIe signal lanes 104 or second root port PCIe signal lanes 204. Once it is determined what type of module is present or not in the M.2 PCIe interface 160, then in block 324, the instructions 312 may configure the multiplexor 206, 207, 208 as described previously for FIGS. 2 and 3 depending on the type of non-standard module 140, 141, 150, 151, the type of multiplexor 206, 207, 208, and the type of external I/O port 110, 210 present in the fourth computer device 10D using mux control signals 306 from the processor 310. In some examples, the multiplexor 206, 207, 208 may be configured directly to or with additional hardware logic using the interface configuration pins 304 and/or the port configuration pins 302 coupling to the mux control signals 306.

Accordingly, a non-transitory computer readable medium 320 is coupled to a processor 310 and comprising instructions 312 that when read and executed on the processor 310 cause the processor 310 to configure the multiplexor 206, 207, 208 based on a type of module 140, 150 in the M.2 PCIe interface 160. The instruction 312 may be part of a BIOS routine in the computer readable medium 120. The instructions 312 as in block 322 determine a type of module, whether a non-standard module 140 or a standard module 150, coupled to the adaptable connector 130. The instructions 312 also as in block 324 configure a multiplexor 206, 207, 208 based on the type of module determined. When the type of module is determined to be a first type, such as non-standard module 140, the multiplexor 206, 207, 208 is configured to route a set of non-PCIe signal lanes, such as I/O port signal lanes 102 between the adaptable connector 130 and an external I/O port 110, 210. When the type of module is determined a second type, such as standard module 150, the multiplexor 206, 208 is configured to route a set of PCIe signal lanes, such as second set of PCIe signal lanes 204 between a PCIe root port complex 122 and the adaptable connector 130.

The instructions 312 may also determine a type of external I/O port 112, 210 and configure the multiplexor 206, 207, 208 to route an additional set of PCIe signal lanes between the PCIe root port complex 122 and the external I/O port 110, 210 when the determined type of external I/O port 110, 220 supports a PCIe interface, such as alternative external I/O port 210.

Implementations of the various examples described herein may include logic or several components, modules, or constituents. Modules may constitute either software modules, such as code embedded in tangible non-transitory machine readable medium 320 or hardware modules. A hardware module is a tangible unit capable of performing certain operations and may be configured or arranged in certain manners. In one example, one or more computer devices 10A-10D or one or more hardware modules of a computer devices 10A-10D may be configured by software (e.g. an application, or portion of an application) as a hardware module that operates to perform certain operations as described herein.

In some examples, non-standard module 140, network-based module 141, standard module 150, storage-based standard module 151, multiplexors 206, 207, 208, and other hardware modules may be implemented as electronically programmable. For instance, a hardware module may include dedicated circuitry or logic that is permanently configured (e.g. as a special-purpose processor, state machine, a field programmable gate array (FPGA) or an application specific integrated circuit (ASIC) to perform certain operations. A hardware module may also include programmable logic or circuitry (e.g. as encompassed within a general-purpose processor or other programmable processor) that is temporarily configured by software to perform certain operations. It will be appreciated that the decision to implement a hardware module electronically in dedicated and permanently configured circuitry, or in temporarily configured circuitry (e.g. configured by software) may be driven by cost and time considerations.

Figure 4A:
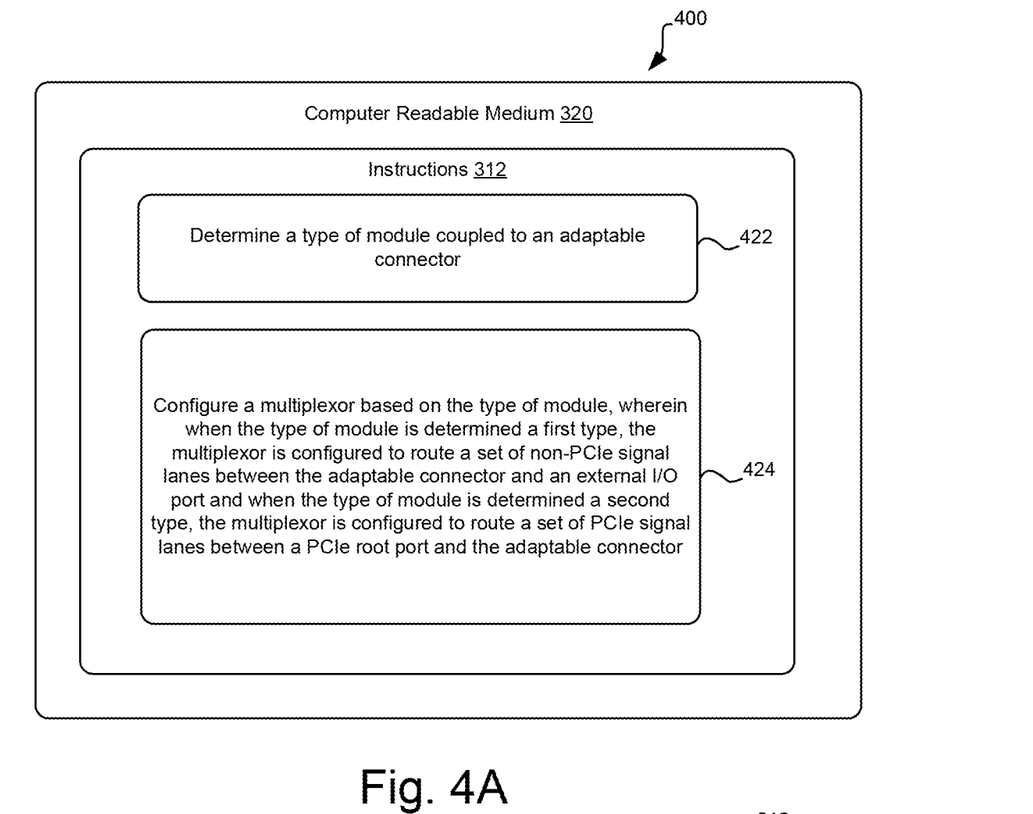
FIG. 4A is a block diagram of a non-transitory computer readable medium with example instructions to implement an example adaptable connector with an external I/O port.

FIG. 4 is a block diagram 400 of a non-transitory computer readable medium 320 with example instructions 312 to implement an example adaptable connector 130 with an external I/O port 110, 210. In block 422 a type of module that is coupled to an adaptable connector 130 is determined. The module may be a standard module 150 or a non-standard module 140. In block 424, a multiplexor 206, 207, 208 is configured based on the type of module detected in block 422. When the type of module is determined to be a first type, such as non-standard module 140, the multiplexor 206, 207, 208 is configured to route a set of non-PCIe signal lanes (for example, I/O port signal lanes 102) between the adaptable connector 130 and an external I/O port 110, 210. When the type of module is determined to be a second type, such as standard module 150, the multiplexor 206, 207, 208 is configured to route a set of PCIe signal lanes (for example, first root port PCIe signal lanes 104) between a PCIe root port 120 and the adaptable connector 130.

Figure 4B:
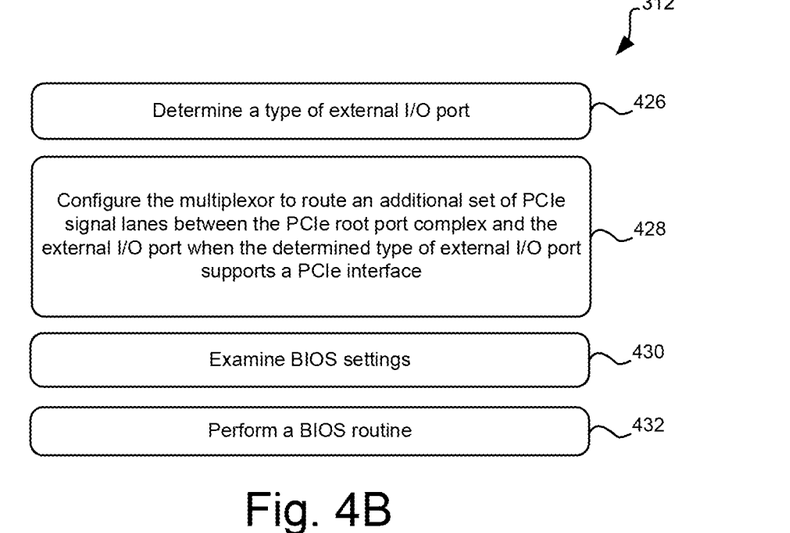
FIG. 4B is a block diagram of additional example instructions for the non-transitory computer readable medium of FIG. 4A.

FIG. 4B are some additional instructions 312 that may be included on CRM 320. For example, the external I/O port 110, 210 may be configurable to hold multiple different I/O interface connectors and PCIe-based I/O interfaces. The PCIe root port 120 may a PCI root port complex 122. In this example, in block 426, the instructions 312 may determine a type of external I/O port 110, 210 and in block 428 the instructions 312 may configure the multiplexor 206, 207, 208 to route an additional set of PCIe signal lanes (for example, second set of PCIe signal lanes 105) between the PCIe root port complex 122 and the external I/O port 110, 210 when the determined type of external I/O port supports a PCIe interface.

To help in determining the type of module coupled to the adaptable connector 130, at least one of the external I/O port 110, 210 and the adaptable connector 130 may have a set of hardware straps readable by a processor 310. In some examples, the set of non-PCIe signal lanes 106 are management data input/output (MDIO) signal lanes for an Ethernet interface and the adaptable connector 130 has the mechanical interface of a PCIe M.2×4 connector. Also, block 422 that determines a type of module or block 426 that determines a type of external I/O port 110, 210 may each include additional instructions 312 such as in block 430 to examine BIOS settings or in block 432 to perform a BIOS routine.

While the claimed subject matter has been particularly shown and described with reference to the foregoing examples, those skilled in the art will understand that many variations may be made therein without departing from the intended scope of subject matter in the following claims. This description should be understood to include all novel and non-obvious combinations of elements described herein, and claims may be presented in this or a later application to any novel and non-obvious combination of these elements. The foregoing examples are illustrative, and no single feature or element is to be used in all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A non-transitory computer readable medium storing instructions executable by a processor to:
   determine whether a module coupled to an adaptable connector is a first type or a second type, a first set of PCI signals routed between the adaptable connector and a PCIe root port regardless of whether the module is the first type or the second type;
   in response to determining that the module is the first type, configure a multiplexor to route a set of non-PCIe signal lanes between the adaptable connector and an external I/O port, such that just the first set of PCIe signal lanes and not a second set of PCIe signal lanes are routed between the adaptable connector and the PCIe root port; and
   in response to determining that the module is the second type, configure the multiplexor to route the second set of PCIe signal lanes between the adaptable connector and the PCIe root port, such that both the first and second sets of PCIe signal lanes are routed between the adaptable connector and the PCIe root port.

2. The non-transitory computer readable medium of claim 1, wherein the external I/O port or the adaptable connector has a set of hardware straps readable by the processor to determine the type of the module.

3. The non-transitory computer readable medium of claim 1, wherein the set of non-PCIe signal lanes are management data input/output (MDIO) signal lanes for an Ethernet interface and the adaptable connector has the mechanical interface of a PCIe M.2×4 connector.

4. The non-transitory computer readable medium of claim 1, wherein the processor is to determine the type of module by examining BIOS settings or by performing a BIOS routine.

5. A device comprising:
a PCIe root port;
a module that is a first type or a second type;
an adaptable connector coupled to the module and having a first set of PCIe signal lanes between routed to the PCIe root port;
an external I/O port having a set of non-PCIe signal lanes; and
a multiplexer to:
route the set of non-PCIe signal lanes between the external I/O port and the adaptable connector when the module is the first type, such that just the first set of PCIe signal lanes and not a second set of PCIe signal lanes are routed between the adaptable connector and the PCIe root port; and
route the second set PCIe signal lanes between the adaptable connector and the PCIe root pot when the module is the second type, such that both the first and second sets of PCIe signal lanes are routed between the adaptable connector and the PCIe root port.

6. The device of claim 5, further comprising:
a processor coupled to a non-transitory computer readable medium having a BIOS routine executable by the processor to determine the type of the module and accordingly configure the multiplexor.

7. The device of claim 6, wherein the multiplexor is configured via a hardware strap on the module or the external I/O port.

8. The device of claim 5, wherein the external I/O port is configurable to different mechanical connectors and electrical interfaces.

9. The device of claim 8, wherein the external I/O port includes an Ethernet RJ45 port connector and the adaptable connector is a PCIe M.2 type connector.

10. The device of claim 5, wherein the module is a PCIe network-based module adapted to provide a set of management data I/O (MDIO) signal lanes to the set of non-PCIe signal lanes of the adaptable connector.

11. A method comprising:
routing a first set of PCI signals between an adaptable connector and a PCIe root port, regardless of whether a module coupled to the adaptable connector is a first type or a second type;
routing, by a multiplexer configured in accordance with the module being the first type, a set of non-PCIe signal lanes between the adaptable connector and an external I/O port, such that just the first set of PCIe signal lanes and not a second set of PCIe signal lanes are routed between the adaptable connector and the PCIe root port; and
routing, by the multiplexer configured in accordance with the module being the second type, the second set of PCIe signal lanes between the adaptable connector and the PCIe root port, such that both the first and second sets of PCIe signal lanes are routed between the adaptable connector and the PCIe root port.

12. The method of claim 8, further comprising:
determining, by a processor, whether the module is the first type or the second type; and
configuring the multiplexer, by the processor, according to whether the module is the first type or the second type.

13. The method of claim 12, wherein determining whether the module is the first type or the second type comprises examining BIOS settings or performing a BIOS routine.

14. The method of claim 8, wherein the external I/O port or the adaptable connector has a set of hardware straps that are readable to determine the type of the module.

15. The method of claim 8, wherein the set of non-PCIe signal lanes are management data input/output (MDIO) signal lanes for an Ethernet interface and the adaptable connector has the mechanical interface of a PCIe M.2×4 connector.

* * * * *